United States Patent
Gerszberg et al.

(10) Patent No.: US 7,664,400 B1
(45) Date of Patent: *Feb. 16, 2010

(54) INTEGRATED ELECTRO-OPTIC HYBRID COMMUNICATION SYSTEM

(75) Inventors: Irwin Gerszberg, Kendall Park, NJ (US); Jeremiah A. Okoro, Landing, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/005,190

(22) Filed: Dec. 26, 2007

Related U.S. Application Data (63) Continuation of application No. 10/162,641, filed on Jun. 6, 2002, now Pat. No. 7,336,902.

(51) Int. Cl.
*H04B 10/00* (2006.01)
(52) U.S. Cl. .................... 398/115; 398/74; 398/116
(58) Field of Classification Search .................. 398/46, 398/74, 115, 116, 117
See application file for complete search history.

(56) References Cited

U.S. PATENT DOCUMENTS

| | | | | |
|---|---|---|---|---|
| 5,585,953 A | * | 12/1996 | Zavrel | 398/115 |
| 6,314,163 B1 | * | 11/2001 | Acampora | 379/56.2 |
| 7,274,876 B2 | * | 9/2007 | Gerszberg et al. | 398/115 |
| 7,336,902 B1 | * | 2/2008 | Gerszberg et al. | 398/115 |
| 2002/0094842 A1 | * | 7/2002 | Aburakawa et al. | 455/561 |
| 2002/0122230 A1 | * | 9/2002 | Izadpanah et al. | 359/145 |

* cited by examiner

*Primary Examiner*—Dzung D Tran (57) ABSTRACT

A system according to embodiments of the invention may comprise a first communication path that converts an optically-modulated source signal to a radio signal based on a detected degradation in a quality of a received optical signal, and a second communication path that converts a radio-modulated source signal to an optical signal based on a detected degradation in a quality of a received radio signal. The system may therefore adapt to diverse weather conditions to improve the reliability of a communication link.

2 Claims, 6 Drawing Sheets

INTEGRATED ELECTRO-OPTIC HYBRID COMMUNICATION SYSTEM

CROSS-REFERENCE TO RELATED APPLICATIONS

The present application is a continuation of U.S. patent application Ser. No. 10/162,641 filed on Jun. 6, 2002 and entitled, "Integrated Electro-Optic Hybrid Communication System," which issued on Feb. 26, 2008 as U.S. Pat. No. 7,336,902.

TECHNICAL FIELD

The present invention relates generally to communication systems, and more particularly to a communication system which combines optical and electrical transmitting and receiving capabilities to provide a highly reliable communication link in diverse weather conditions.

BACKGROUND OF THE INVENTION

Communications systems have seen exponential growth in demand for bandwidth by the large and small business communities. Moreover, businesses demand a high level of availability in the communication systems. One known measure of availability which communication services providers strive to sustain is "five nines" availability, wherein a communication link may be down for only a few minutes a year.

Free space optics (FSO) and broadband radio are two technologies that have been proposed to meet the demand for bandwidth. FSO, however, while providing "infinite" bandwidth, has some drawbacks. For instance, fog may disperse the light beam, thereby rendering reception impossible for long haul communication. Accordingly, for five nines availability, FSO is primarily used for short links (less than 1.5 km). In Europe, for example, FSO has been deployed for applications such as short hops.

Broadband radio technology, on the other hand, is not hampered by fog as is FSO, and accordingly is more reliable for long haul communication. However, heavy rain tends to degrade radio performance. FSO performance, by contrast, is not as quickly degraded by heavy rain.

In view of the foregoing considerations, a system is called for to address the growing demand for bandwidth along with a high level of availability in communication systems.

SUMMARY OF THE INVENTION

Embodiments of the present invention relate to a "hybrid" communication system that includes a combination of radio and optical elements. The system may comprise a hybrid transmit path that converts an optically-modulated source signal to a radio signal based on a detected degradation in a quality of a received optical signal, and a hybrid transmit path that converts a radio-modulated source signal to an optical signal based on a detected degradation in a quality of a received radio signal. The respective hybrid transmit paths may also function as corresponding hybrid receive paths for received signals. The system may communicate with another system of substantially the same kind to inform the other system when hybrid paths are being used, and to instruct the other system to transmit correspondingly in return.

The system may further comprise optical-only transmit and receive paths, and radio-only transmit and receive paths. The system is therefore able to receive and transmit an optical signal under conditions that are more favorable to the optical signal than to a radio signal, and receive and transmit a radio signal under conditions that are more favorable to the radio signal than to the optical signal. But, the system is further able to adapt to diverse weather conditions, by forming hybrid transmit and receive paths depending on the conditions. For example, in foggy conditions, the system could convert an optically-modulated source signal to a radio signal and transmit the radio signal, and instruct another system to transmit a radio signal in return. Thus, communication between the two systems would be via radio signals, which are not adversely affected by fog in a significant way. Alternatively, in heavy rain, the system could convert a radio-modulated source signal to an optical signal and transmit the optical signal, and instruct another system to transmit an optical signal in return. Thus, communication between the two systems would be via optical signals, which are not adversely affected by heavy rain in a significant way. Accordingly, a communication link that uses the system may be reliably maintained.

DETAILED DESCRIPTION

Figure 1:
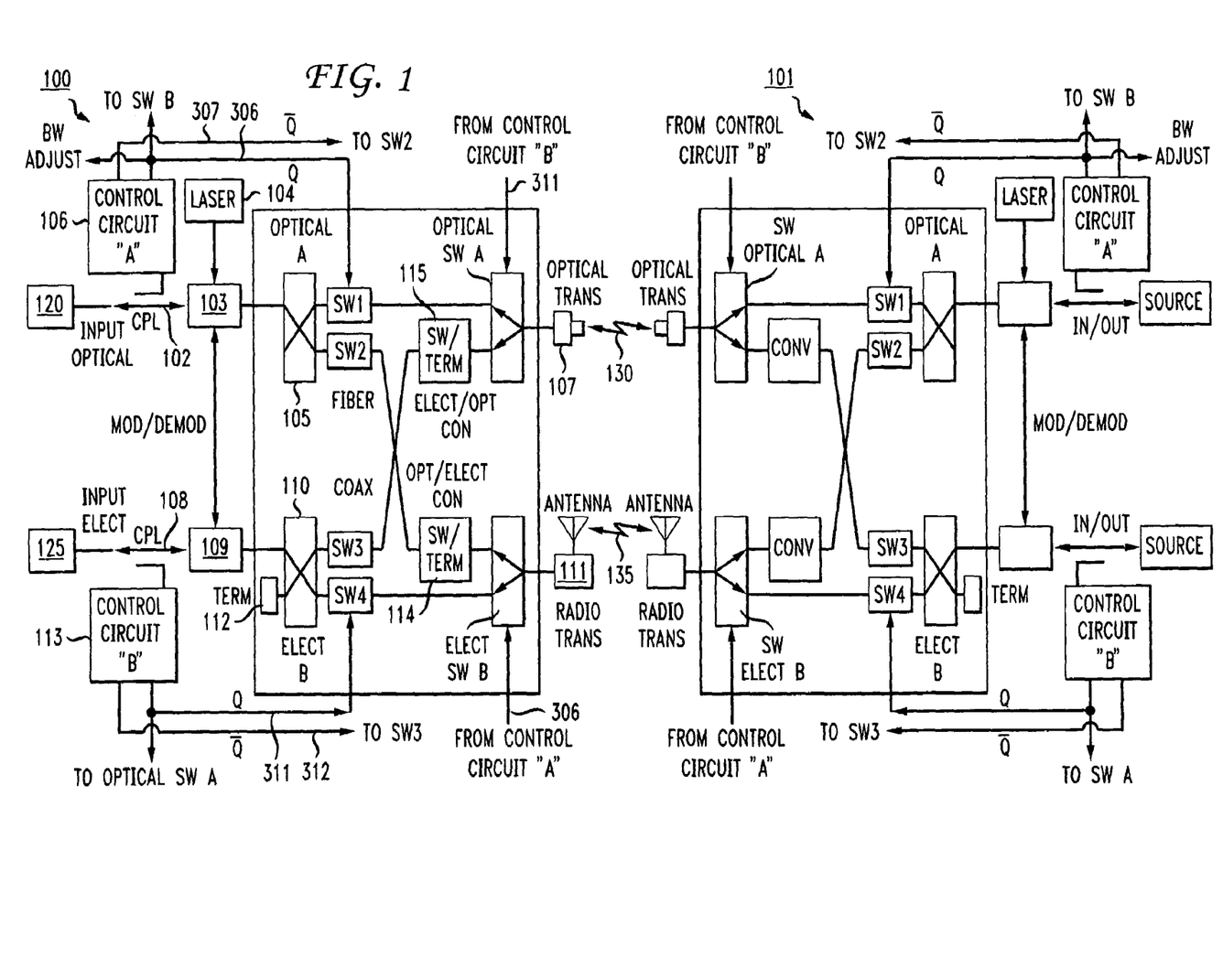
FIG. 1 shows a hybrid radio/optical communication system according to embodiments of the invention.

FIG. 1 shows a communication apparatus according to embodiments of the invention. The apparatus may comprise a system 100 and a system 101 that may communicate with each other. System 100 and system 101 may be substantially identical, and therefore only system 100 will be discussed in detail. In an overall communication network setting, system 100 and system 101 could differ from each other in that one system could have control over some operations of the other system. For example, system 100 could be a "local" or "control" system while system 101 was a "remote" system having some aspects of its operations controlled by system 100.

System 100 may be configured to receive and transmit both optical signals and radio signals. System 100 may provide transmit and receive communication paths that are optical-only, radio-only, or a "hybrid" of optical and radio. More particularly, system 100 may provide a transmit path for a source signal that is optically modulated and transmitted using optical transmitting equipment, and may provide a transmit path for a source signal that is radio modulated (i.e., uses radio modulation) and is transmitted using radio transmitting equipment. On the other hand, if a degradation in a quality of a received optical signal is detected, a transmit path through system 100 for the optically-modulated source signal may be formed which originates in optical modulating equipment but subsequently uses radio transmitting equipment, creating a hybrid optical-to-radio transmit path. Alternatively, if a degradation in a quality of a received radio signal is detected, a transmit path through system 100 for the radio-modulated source signal may be formed which originates in radio modulating equipment but subsequently uses optical transmitting equipment, creating a hybrid radio-to-optical transmit path. The hybrid transmit paths thus formed may also function as corresponding hybrid receive paths.

System 100 may comprise a coupler 102 that connects a source 120 to an optical modulator/demodulator 103. Source 120 could provide voice, data or video, for example. Modulator/demodulator 103 may include a telemetry circuit via which a "handshake" comprising control and status signals may be exchanged with system 101. A received optical signal may also be coupled by coupler 102 to a control circuit 106 for detecting degradation in a quality of the received optical signal and causing a hybrid optical-to-radio transmit path to be formed in response, as discussed in more detail below. Modulator/demodulator 103 optically modulates a laser 104 with source signal 120. The modulated signal may then be input to an optical signal splitter 105 which splits the modulated signal into two separate identical signals, forming a first output and a second output of the optical signal splitter 105. Optical signal splitter 105 may comprise mirrors. The mirrors may, for example, be discrete mirrors, or be fabricated on a GaAs substrate using microwave monolithic integrated circuit (MMIC) technology.

The first output of optical signal splitter 105 may be input to a first switch, SW1, and the second output of optical signal splitter 105 may be input to a second switch, SW2. Typically, under circumstances which are more favorable to communication via an optical signal than to communication via radio, SW2 would be open and SW1 would be closed. Control circuit 106 may control which of SW1 and SW2 is open and which is closed. SW1 and SW2 may be non-reflective switches.

The output of SW1 may be connected to a first input of an optical switch, SW A. SW A may be a single-pole-double-throw optical switch. The output of SW A may be connected to an optical transceiver 107 for transmitting or receiving an optical signal. The output of SW2 may be connected to an optical-to-electrical signal converter 114 for converting an optical signal to a radio signal. Optical-to-electrical signal converter 114 may also function as an electrical-to-optical signal converter for a received radio signal. The connection of SW2 to optical-to-electrical signal converter 114 may be via an optical fiber medium. Optical-to-electrical signal converter 114 may be connected to a first input of an electrical switch, SW B. SW B may be a single-pole-double-throw electrical switch. The output of SW B may be connected to a radio transceiver 111 for transmitting or receiving a radio signal.

System 100 may further comprise a coupler 108 that connects a source 125 that provides, e.g., voice, data or video, to a radio modulator/demodulator 109. A received radio signal may also be coupled by coupler 108 to a control circuit 113 for detecting degradation in a quality of the received radio signal and causing a hybrid radio-to-optical transmit path to be formed in response, as discussed in more detail below. The modulated signal from modulator/demodulator 109 may be input to a radio signal splitter 110 which splits the modulated signal into two separate identical signals, forming a first output and a second output of the radio signal splitter 110. Radio signal splitter 110 may be a 90-degree splitter.

The first output of radio signal splitter 110 may be input to a third switch, SW3, and the second output of radio signal splitter 110 may be input to a fourth switch, SW4. Typically, under circumstances which are more favorable to communication via radio than to communication via an optical signal, SW3 would be open and SW4 would be closed. SW3 may be coupled to a terminator 112 to prevent reflections back to the input source. Control circuit 113 may control which of SW3 and SW4 is open and which is closed. SW3 and SW4 may be non-reflective switches.

The output of SW3 may be connected to an electrical-to-optical signal converter 115 for converting a radio signal to an optical signal. Electrical-to-optical signal converter 115 may also function as an optical-to-electrical signal converter for a received optical signal. The connection of SW3 to electrical-to-optical signal converter 115 may be via a coaxial cable. Electrical-to-optical signal converter 115 may be connected to a second input of SW A. The output of SW4 may be connected to a second input of SW B.

Reference numeral 130 represents optical signals being transmitted and received by optical transceiver 107 and an optical transceiver of system 101. Reference numeral 135 represents radio signals being transmitted and received by radio transceiver 111 and a radio transceiver of system 101. A received optical signal may travel one of the communication paths described above, but in the opposite direction from a transmitted source signal. That is, a received optical signal could travel an optical-only receive path or a hybrid optical-to-radio receive path, depending on the states of switches SW A, SW B and SW1-SW4. For example, in an optical-only receive path, SW1 could be closed, SW2 could be open, and SW A could be connected to SW1. In this arrangement, a received optical signal would travel from optical transceiver 107 through SW A, SW1 and optical signal splitter 105, to be demodulated by optical modulator/demodulator 103. The demodulated signal would then be coupled by coupler 102 to control circuit 106, which may be configured to detect degradation in a quality of the received optical signal and cause a hybrid optical-to-radio transmit path to be formed in response, as discussed in more detail below.

On the other hand, SW2 could be closed, SW1 could be open, and SW B could be connected to optical-to-electrical converter 114 to form a hybrid radio-to-optical receive path. In this arrangement, a received radio signal would travel from radio transceiver 111 through SW B, and be converted to an optical signal by converter 114. The converted received signal would then travel through SW 2 and splitter 105 to be demodulated by modulator/demodulator 103. The demodulated signal would then be coupled by coupler 102 to control circuit 106 to detect degradation in a quality of the received radio (now converted to optical) signal.

Symmetrically, a received radio signal could travel a radio-only receive path or a hybrid optical-to-radio receive path, depending on the statuses of switches SW A, SW B and SW1-SW4. For example, in a radio-only receive path, SW4 could be closed, SW3 could be open, and SW B could be connected to SW4. In this arrangement, a received radio signal would travel from radio transceiver 111 through SW B, SW4 and radio signal splitter 110, to be demodulated by radio modulator/demodulator 109. The demodulated signal would then be coupled by coupler 108 to control circuit 113, which may be configured to detect degradation in a quality of the received radio signal and cause a hybrid radio-to-optical transmit path to be formed in response, as discussed in more detail below.

On the other hand, SW3 could be closed, SW4 could be open, and SW A could be connected to electrical-to-optical converter 115 to form a hybrid optical-to-radio receive path. In this arrangement, a received optical signal would travel from optical transceiver 107 through SW A, and be converted to a radio signal by converter 115. The converted received signal would then travel through SW 3 and splitter 110 to be demodulated by modulator/demodulator 109. The demodulated signal would then be coupled by coupler 108 to control circuit 113 to detect degradation in a quality of the received optical (now converted to radio) signal.

Figure 3:
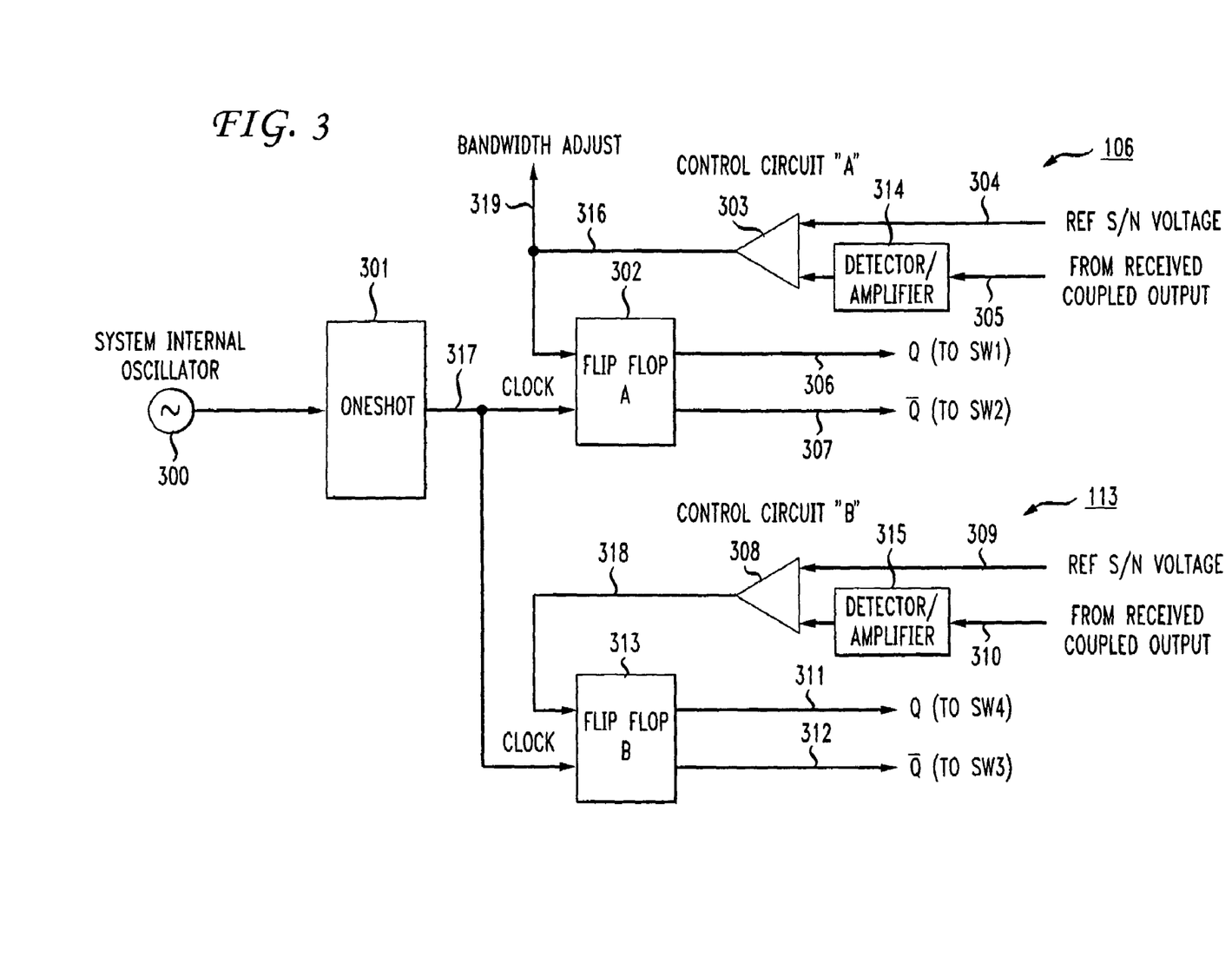
FIG. 3 shows detail of a control circuit according to embodiments of the invention.

FIG. 3 shows details of one possible embodiment of a circuit that could be used to implement control circuits 106 and 113 for detecting degradation in a received optical signal and a received radio signal, respectively, and causing a corresponding hybrid transmit/receive path to be formed in response. For example, control circuit 106 (arbitrarily designated "A" for purposes of illustration) could comprise an operational amplifier 303 which outputs a difference signal 316. Inputs to operational amplifier 303 could include a reference signal-to-noise (S/N) voltage signal 304 and received optical signal 305, coupled to control circuit 106 by coupler 102 as shown in FIG. 1. Received optical signal 305 could be processed by a detector/amplifier 314 before being input to operational amplifier 303. Difference signal 316 could be input to a flip-flop 302 with outputs Q 306 and /Q (Q complement) 307. As shown in FIG. 1, Q 306 may be connected to switch SW1 and /Q 307 may be connected to switch SW2. Thus, a change in state of Q 306 and /Q 307 could, for example, cause switch SW1 to open and switch SW2 to close, or vice versa. Also, as shown in FIG. 1, Q 306 could be input to SW B so that a change in state of Q 306 could cause SW B to select a different input. Flip-flop 302 could also have a clock input 317, generated by a system internal oscillator 300 coupled to a oneshot circuit 301 for adjusting the clock pulse width.

Difference signal 316 could indicate a degradation in the quality of received optical signal 305. That is, if a difference between received optical signal 305 and reference signal-to-noise (S/N) voltage signal 304 was less than a predetermined threshold amount or level, the quality of received optical signal 305 could be considered to be acceptable. On the other hand, if a difference between received optical signal 305 and reference signal-to-noise (S/N) voltage signal 304 was greater than a predetermined threshold amount or level, the quality of received optical signal 305 could be considered to be unacceptable.

More particularly, a difference between received optical signal 305 and reference signal-to-noise (S/N) voltage signal 304 could be small enough that difference signal 316 was equivalent to a logic "0" when input to flip-flop 302. While difference signal 316 remained at a logic "0" level, the clock input 317 would not cause any change in the Q 306 and /Q 307 outputs of flip-flop 302. Assuming that SW1 was closed, SW2 was open and that SW A was connected to SW1, system 100 would provide optical-only transmit and receive paths for source 120 and for received input signal 305, respectively.

On the other hand, the quality of received optical signal 305 could be degraded to the extent that a difference between received optical signal 305 and reference signal-to-noise (S/N) voltage signal 304 could become large enough that difference signal 316 would change from the equivalent of a logic "0" to the equivalent to a logic "1" when input to flip-flop 302. In that event, the values of Q 306 and /Q 307 would "flip"; i.e., be reversed, causing switch SW1 to open, switch SW2 to close and SW B to select the input from optical-to-electrical signal converter 114. By closing SW2, the output of optical modulator/demodulator 103 would be converted to a radio signal by optical-to-electrical signal converter 114 and transmitted by radio transceiver 111. At substantially the same time, system 100 would exchange a handshake with system 101, i.e., exchange pre-arranged telemetry signals with system 101. The handshake would inform system 101 that system 100 had formed a hybrid optical-to-radio transmit path for source 120 and instruct system 101 to stop transmitting optical signals to system 100 and instead begin transmitting radio signals to system 100. The hybrid optical-to-radio transmit path formed by system 100 would also function as a hybrid radio-to-optical receive path for a received radio signal from system 101. Therefore, based on the handshake, system 101 would begin transmitting a radio signal to system 100, for example, by forming a hybrid optical-to-radio transmit path or a radio-only transmit path. The paths thus formed by system 101 would also function as receive paths for the radio signals now being transmitted by system 100.

Control circuit 106 could further include a bandwidth adjust signal 319 for adjusting the bandwidth of the radio signal, in the event that the optical data source has a bandwidth or capacity that is greater than the bandwidth or capacity of the radio/antenna.

Control circuit 113 (arbitrarily designated "B" for purposes of illustration) may be symmetrical to control circuit 106. Control circuit 113 could comprise an operational amplifier 308 which outputs a difference signal 318. Inputs to operational amplifier 308 could include a reference signal-to-noise (S/N) voltage signal 309 and a received radio [input] signal 310, coupled to control circuit 113 by coupler 108 as shown in FIG. 1. Received radio signal 310 could be processed by a detector/amplifier 315 before being input to operational amplifier 308. Difference signal 318 could be input to a flip-flop 313 with outputs Q 311 and /Q 312. As shown in FIG. 1, Q 311 may be connected to switch SW4 and /Q may be connected to switch SW3. Thus, a change in state of Q 311 and /Q 312 could, for example, cause switch SW4 to open and switch SW3 to close, or vice versa. Also, as shown in FIG. 1, Q 311 could be input to SW A so that a change in state of Q 311 could cause SW A to select a different input. Flip-flop 313 could also have clock input 317.

Difference signal 318 could indicate a degradation in the quality of received radio signal 310. In the event of such a degradation, a change in the transmit path for source 125 could be effected to switch from a radio-only path and to instead use a hybrid radio-to-optical path of the system 100. That is, upon difference signal 318 changing to an extent that an unacceptable level of radio signal degradation has occurred, the Q 311 and /Q 312 outputs of flip-flop 313 may change states. Assuming that SW4 had been closed, SW3 had been open and SW B had the input from SW4 selected before the change in state, by closing SW3 and causing SW A to select the input from electrical-to-optical converter 115, the output of radio modulator/demodulator 109 would be converted to an optical signal by electrical-to-optical signal converter 115 and transmitted by optical transceiver 107. At substantially the same time, system 100 would exchange a telemetry handshake with system 101 to cause system 101 to adapt accordingly. The hybrid radio-to-optical transmit path formed by system 100 would also function as a hybrid optical-to-radio receive path for a received optical signal from system 101. Thus, based on the handshake, system 101 would begin transmitting a radio signal to system 100, for example, by forming a hybrid radio-to-optical transmit path or an optical-only transmit path. The paths thus formed by system 101 would also function as receive paths for the optical signals now being transmitted by system 100.

Clearly, in view of the above-described embodiments, if following a switch from either an optical-only path to a hybrid optical-to-radio transmit path and corresponding hybrid radio-to-optical receive path, or from a radio-only to a hybrid radio-to-optical transmit path and corresponding hybrid optical-to-radio receive path, received signal quality improved to the point that it was no longer below the predetermined threshold level, a switch could be performed back from the respective hybrid paths to either an optical-only path or a radio-only path.

Figure 6:
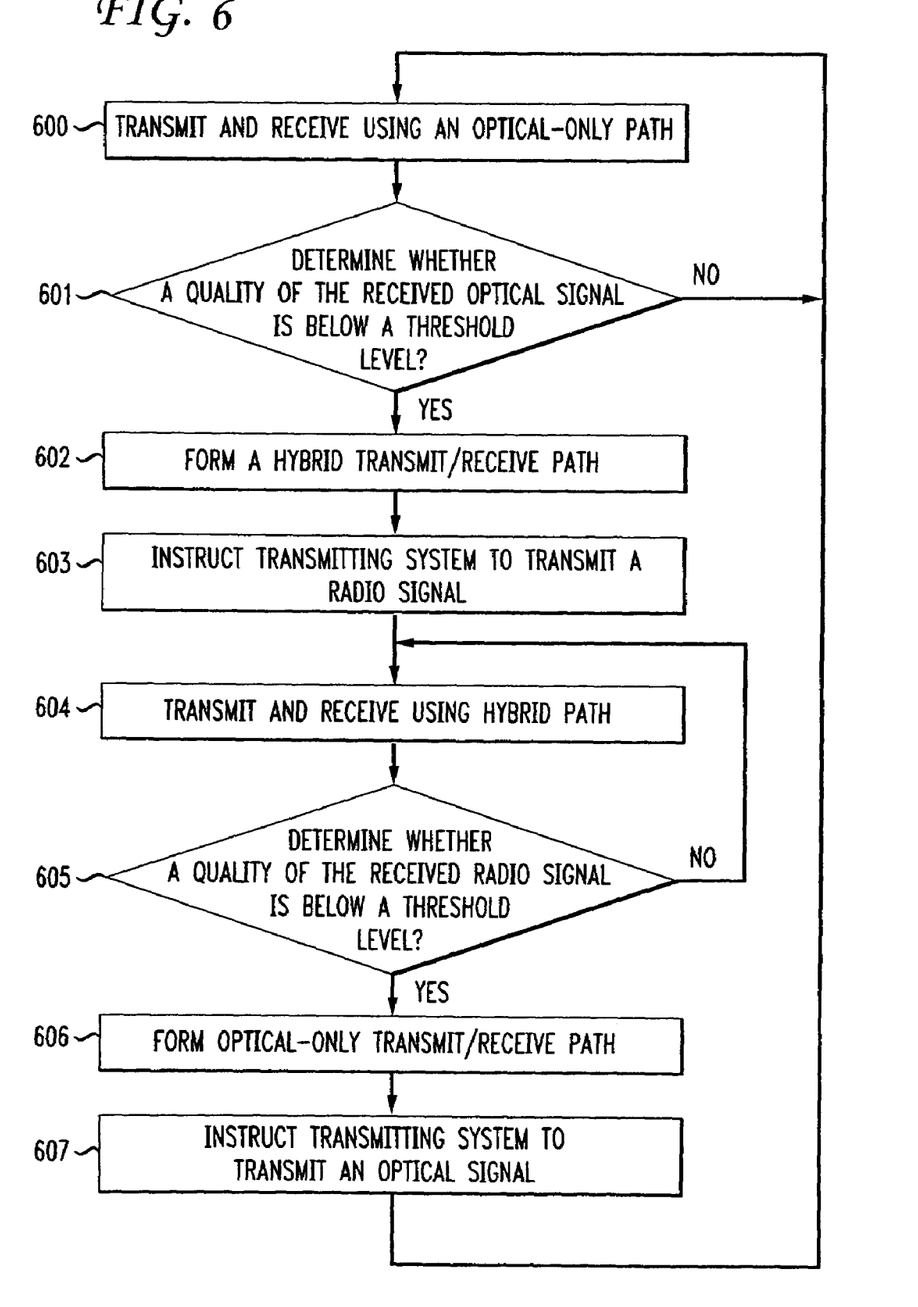
FIG. 6 shows a process flow according to embodiments of the invention.

FIG. 6 shows a process flow according to embodiments of the invention. Assume, initially, an optically-modulated source signal transmitted by first system according to embodiments of the invention, and an optical signal received by the first system from a second system according to embodiments of the invention. As shown in block 600, a first system may transmit the source signal to the second system using an optical-only transmit path, and receive the optical signal from the second system using an optical-only receive path. The first system may monitor a quality of the received optical signal, to determine whether the quality of the received optical signal is below a predetermined threshold level, as shown in block 601.

If the result of the determination of block 601 is that the quality of the received optical signal is not below the predetermined threshold level, the first system may continue to transmit and receive using an optical-only path. On the other hand, if the result of the determination of block 601 is that the quality of the received optical signal is below the predetermined threshold level, the first system may form a hybrid transmit path, as described above, for the source signal that converts the source signal into a radio signal which is transmitted to the second system, as shown in block 602. The transmit path thus formed may also function as a corresponding hybrid receive path for a radio input signal, as described above. At substantially the same time, the first system may instruct the second system to stop transmitting an optical signal to the first system and instead transmit a radio signal to the first system, as shown in block 603.

The first system may then transmit and receive using the hybrid path for a period of time, as shown in block 604. The first system may monitor a quality of the received radio signal, to determine whether the quality of the received radio signal is below a predetermined threshold level, as shown in block 605. If the result of the determination of block 605 is that the quality of the received radio signal is not below the predetermined threshold level, the first system may continue to transmit and receive using an optical-only path. On the other hand, if the result of the determination of block 605 is that the quality of the received radio signal is below the predetermined threshold level, the first system may again form a transmit path for the source signal that is optical-only, as shown in block 606. At substantially the same time, the first system may instruct the second system to stop transmitting a radio signal to the first system and instead transmit an optical signal to the first system, as shown in block 606. The first system may then transmit and receive using an optical-only path for a period of time. The foregoing process may be repeated a plurality of times.

A completely parallel process to the process described above could be performed, of course, initially assuming a radio-modulated source signal transmitted by a first system, and a radio signal received by the first system from a second system. Further, in response to the instructions from the first system, the second system may also form hybrid transmit and receive paths, or change from hybrid paths back to optical-only or radio-only paths.

In view of the above-described structures and processes, a system and method according to embodiments of the invention enable a highly reliable communication link that is adaptable to diverse weather conditions. For example, a first system and a second system according to embodiments of the invention might both have optically-modulated sources, and exchange optical signals for a period of time. Then, due to changing weather conditions (for example, the occurrence of heavy fog), the first system might detect a degradation in the quality of its received optical signal. Accordingly, the first system would form a hybrid optical-to-radio transmit path for its source, and at substantially the same time, instruct the second system to do the same. The hybrid optical-to-radio transmit paths thus formed would also function as corresponding hybrid radio-to-optical receive paths. The first and second systems might then transmit and receive via radio signals for a time. The respective optically-modulated sources of the first and second systems would not be affected by the formation of the hybrid paths.

Then, possibly, due to changing weather conditions (for example, the occurrence of heavy rain), the quality of the radio signals exchanged by the first and second systems could degrade. In that event, the first system could switch back to optical-only transmit and receive paths, and instruct the second system to do the same. The first and second systems might then transmit and receive via optical signals for a time, until the quality of the optical signals degraded again, and so on.

A completely parallel process to that described in the foregoing is also readily envisaged, assuming a first system and a second system according to embodiments of the invention both having radio-modulated sources. However, the first and the second systems need not necessarily have like sources. For example, a first system could have a source that was optically modulated, while a second system could have a source that was radio-modulated. By means of a suitable handshake, i.e., by an exchange of pre-arranged telemetry signals between the first system and the second system, either system could be caused to form a suitable hybrid path to communicate with the other system. For example, the first system could form a hybrid optical-to-radio transmit path and corresponding hybrid radio-to-optical receive path, while the second system utilized radio-only transmit and receive paths. Alternatively, the first system could utilize optical-only transmit and receive paths while the second system could form a hybrid radio-to-optical transmit path and corresponding hybrid optical-to-radio receive path. Of course, the foregoing permutations could also be realized with the roles of the first and second systems reversed.

Figure 2:
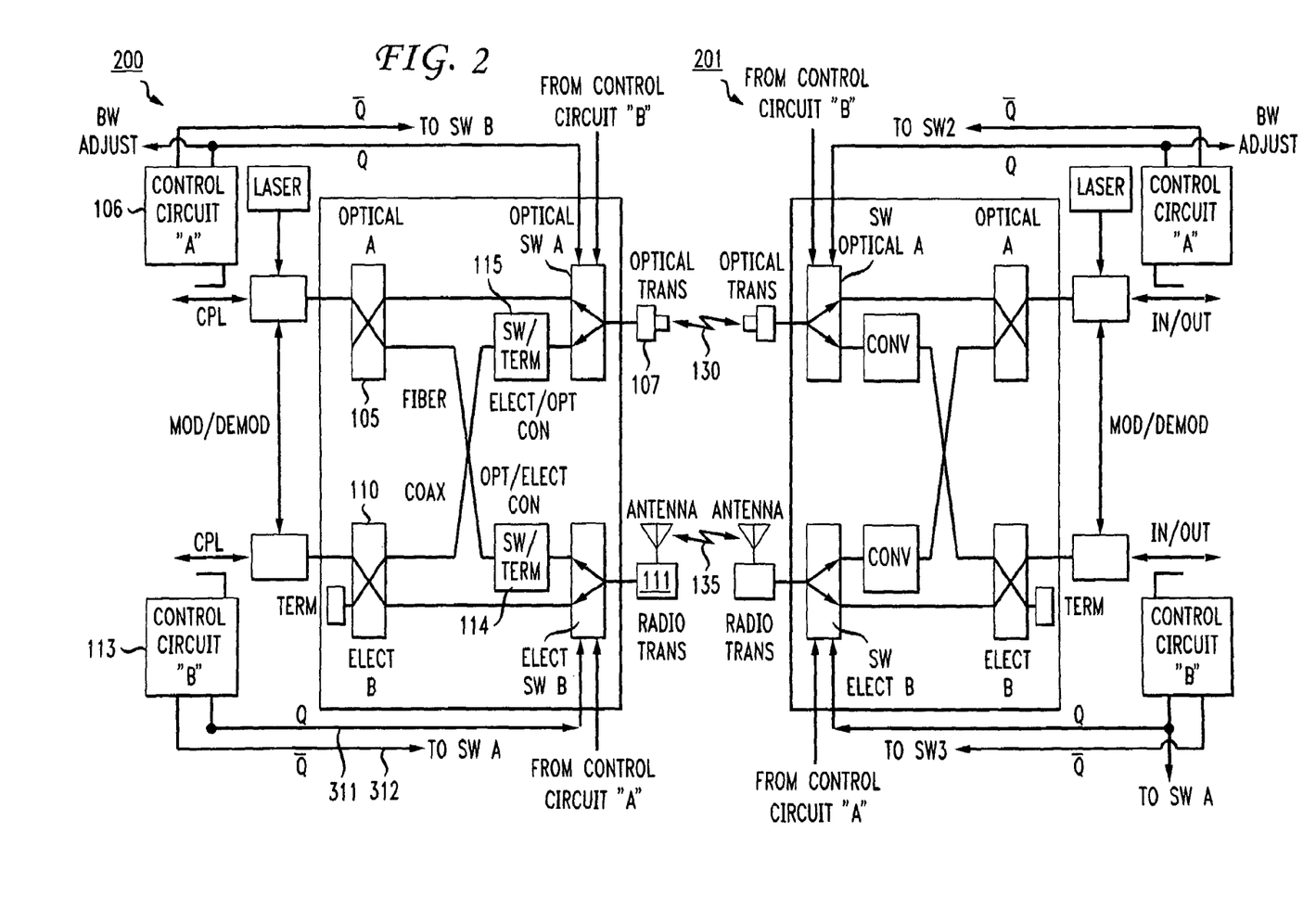
FIG. 2 shows another possible embodiment of a hybrid radio/optical communication system according to the invention.

FIG. 2 shows alternative embodiments to systems 100 and 101. FIG. 2 shows systems 200 and 201 which are identical to systems 100 and 101, respectively, except that switches SW1, SW2, SW3 and SW4 are not included. Instead, the Q and /Q signals from control units 106 and 113 may be coupled directly to switches SW A and SW B. The Q and /Q signals may control whether SW A will receive an "unconverted" optical signal directly from optical signal splitter 105, or whether SW A will received a "converted" optical signal; i.e., a signal which has been converted from a radio signal to an optical signal by electrical-to-optical converter 115. Symmetrically, the Q and /Q signals may control whether SW B will receive an "unconverted" radio signal directly from radio signal splitter 110, or whether SW B will received a "converted" radio signal; i.e., a signal which has been converted from an optical signal to a radio signal by optical-to-electrical converter 114. Depending on which of SW A and SW B is currently carrying the input signal, the transceiver connected to the other switch may be placed in a stand-by mode. That is, if SW A is currently carrying the input signal, radio transceiver 111 may be placed in stand-by mode, and if SW B is currently carrying the input signal, optical transceiver 107 may be placed in stand-by mode. By eliminating switches SW1-SW4 as shown in FIG. 2, a system 200 may be constructed more inexpensively, and may operate more reliably.

Figure 4:
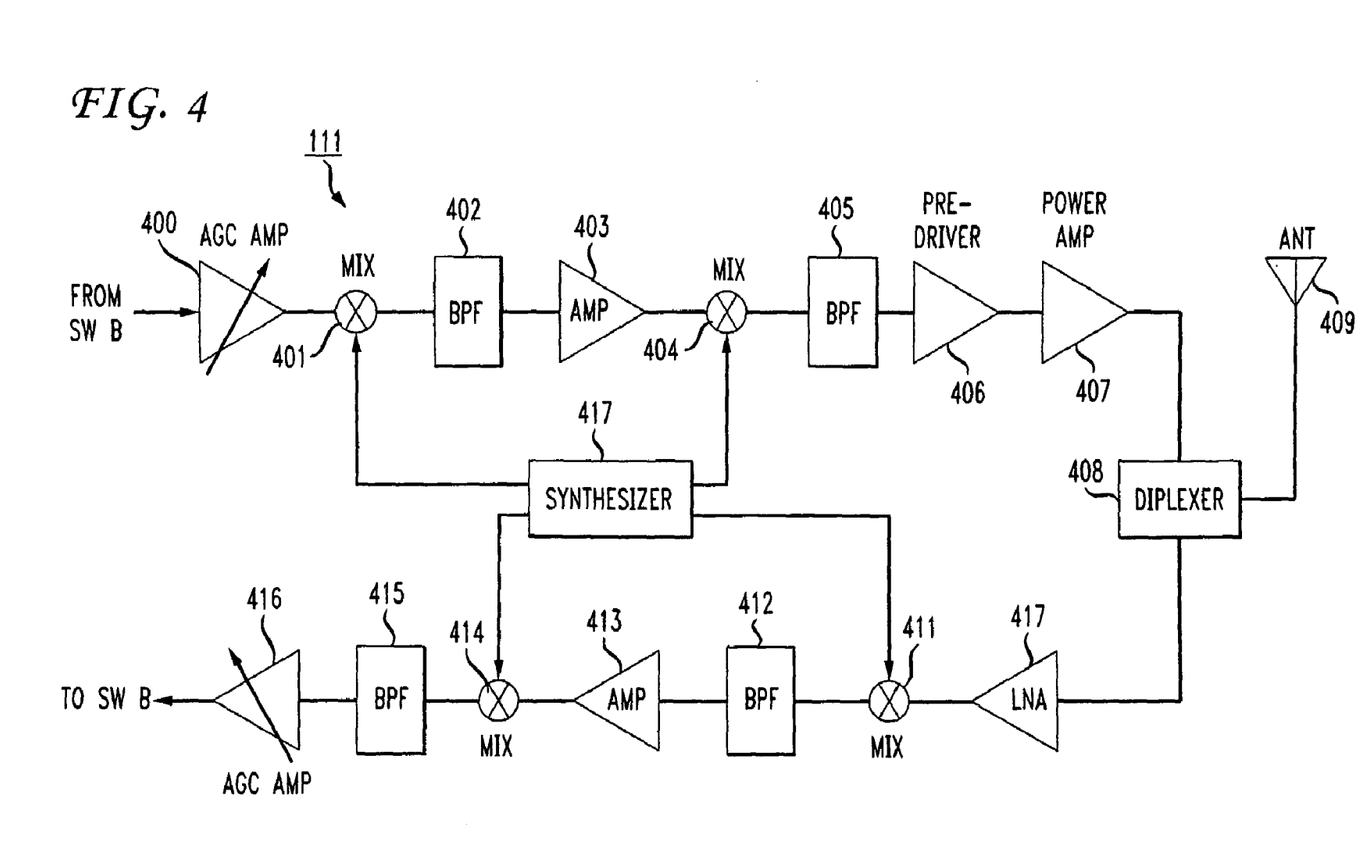
FIG. 4 shows detail of a radio transceiver according to embodiments of the invention.

FIG. 4 shows one possible implementation of radio transceiver 111 according to embodiments of the invention. Radio transceiver 111 may be a standard duplex broadband radio unit. Its transmit path may comprise an AGC (automatic gain control) circuit 400 coupled to a "double conversion front end" comprising a mixer 401 followed by a band-pass filter 402, an amplifier 403, a mixer 404 and a band-pass filter 405. The band-pass filter 405 may be coupled to a pre-driver 406 which is coupled to a power amplifier 407. Power amplifier 407 may be coupled to a diplexer 408 which is in turn coupled to an antenna 409.

Generally, ACG circuit 400 may compensate for losses due to cabling and connectors from SW B. The double conversion front end may translate the IF frequency to the final transmission frequency. Pre-driver 406 and power amplifier 407 amplify the output signal to the desired signal level for over-the-air transmission through antenna 409. Diplexer 408 may contain the transmit band-pass filter for grooming the transmitter output spectrum. Synthesizer 417 may be input to mixers 401 and 405 and may provide local oscillator signals for up-conversion to the desired transmitter frequency.

The receive path of radio transceiver 111 may comprise antenna 409 and diplexer 408, which may contain the receive band-pass filter. Diplexer 408 may be coupled to a low-noise amplifier 410, which may in turn be coupled to a "double conversion down converter" comprising a mixer 411 followed by a band-pass filter 412, an amplifier 413, a mixer 414 and a band-pass filter 415. Band-pass filter 414 may be coupled to an AGC circuit 416 which is input to SW B. AGC circuit 416 may compensate for receiver input variations. Synthesizer 417 may be input to mixers 411 and 414 and provide local oscillator signals for RF frequency down-conversion to an IF signal. The IF signal may be sent via SW B through system 100 for demodulation and data extraction.

According to embodiments, radio transceiver 111 may further comprise such features as a built-in temperature sensor, a voltage standing wave ratio (vswr) monitor, a receive signal level (RSL) indicator, and a transmit power monitor.

Figure 5:
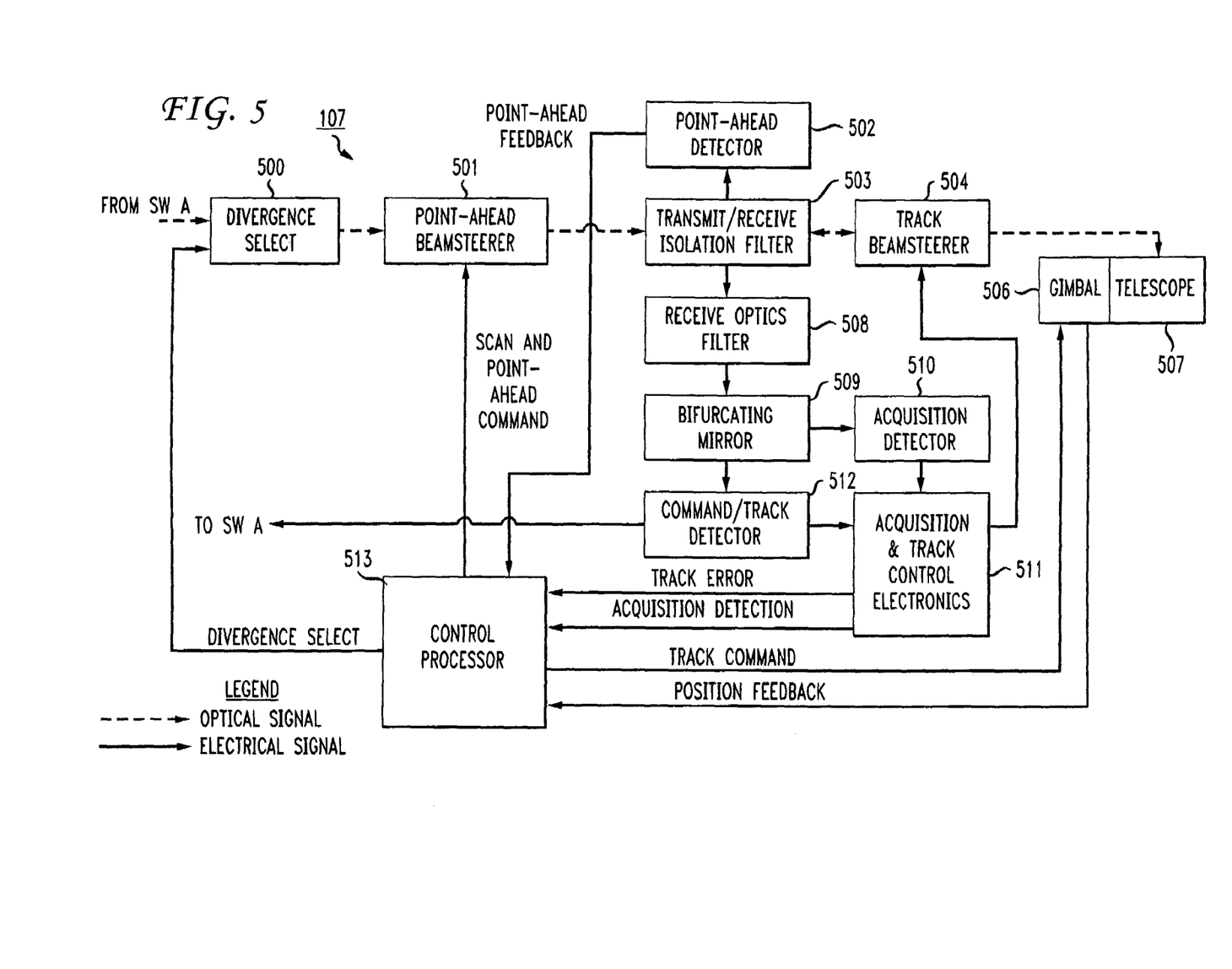
FIG. 5 shows detail of an optical transceiver according to embodiments of the invention.

FIG. 5 shows one possible implementation of optical transceiver 107 according to embodiments of the invention. The transmit path of optical transceiver 107 may comprise a divergence select module 500 followed by a point-ahead beamsteerer 501, a transmit/receive isolation filter 503, a track beamsteerer 504, and a gimbal 506 and telescope 507. The receive path of optical transceiver 107 may comprise telescope 507, followed by track beamsteerer 504, transmit/receive isolation filter 503, receive optics filter 508, bifurcating mirror 509, acquisition detector 510, gimbal 506, a command/track detector 512, and acquisition and track control electronics 511. A control processor 513 may control operations of optical transceiver 107 based on input signals such as a position feedback signal from gimbal 506, an acquisition detection signal and a track error signal from acquisition and track control electronics 511, and a point-ahead feedback signal from a point-ahead detector 502. Control processor may output control signals such as a track command signal to gimbal 506, a scan and point-ahead command to point-ahead beamsteerer 501, and a divergence select signal to divergence select module 500.

In a transmit mode of operation, divergence select module 500 may receive an optical input signal from SW A. A divergence select signal from control processor 513 may select a beam divergence. The optical beam may then be directed to transmit/receive isolation filter 503. Track beamsteerer 504 may focus the beam on telescope 507, which may then beam the optical signal to a remote site.

In a receive mode of operation, telescope 507 may receive an optical signal from a remote site, directing it to track beamsteerer 504 and from there to transmit/receive isolation filter 503. The filtered signal may undergo further filtering, and be split into two optical signals. One of the two optical signals may go to command/track detector 512 and the other to acquisition detector 510. The output of command/track detector 512 may be sent via SW B through system 100 for demodulation. The output of acquisition detector 510 may be sent to acquisition and track control electronics 511, which may provide the track error and acquisition detection signals which are fed to control processor 513.

According to embodiments, radio modulation for the source signal may be 16 QAM, 32 QAM, 64 QAM or another type of modulation, such as QPSK. Optical modulation of the source signal may be on/off keying-type modulation or another type of modulation.

Embodiments of the invention as described above may find useful application in, for example, point-to-point, point-to-multipoint, mesh and star system configurations.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A system comprising:
a first communication device configured to convert an optically-modulated source signal to a radio signal based on a detected degradation in a quality of a received optical signal, the first communication device comprising an optical signal splitter that splits said optically-modulated source signal into first and second optical signals, said first optical signal being coupled to an optical transceiver, and said second optical signal being coupled to an optical-to-electrical converter coupled to a radio transceiver; and a second communication device configured to convert a radio-modulated source signal to an optical signal based on a detected degradation in a quality of a received radio signal;

further comprising a control system configured to detect said degradation in said received optical and radio signals by comparing a respective received signal with a reference value;

wherein said first communication device further comprises first and second optical switches controlled by said control system, said first optical switch being connected between said optical signal splitter and said optical transceiver for switching said first optical signal, and said second optical switch being connected between said optical signal splitter and said optical-to electrical converter for switching said second optical signal.

2. A system comprising:
a first communication device configured to convert an optically-modulated source signal to a radio signal based on a detected degradation in a quality of a received optical signal, the first communication device comprising an optical signal splitter that splits said optically-modulated source signal into first and second optical signals, said first optical signal being coupled to an optical transceiver, and said second optical signal being coupled to an optical-to-electrical converter coupled to a radio transceiver; and a second communication device configured to convert a radio-modulated source signal to an optical signal based on a detected degradation in a quality of a received radio signal;

wherein the second communication device further comprises a radio signal splitter that splits said radio-modulated source signal into first and second radio signals, said first radio signal being coupled to a radio transceiver, and said second radio signal being coupled to an electrical-to-optical converter coupled to the optical transceiver;

the system further comprising a control system configured to detect said degradation in said received optical and radio signals by comparing a respective received signal with a reference value, and wherein said second communication device further comprises first and second electrical switches controlled by said control system, said first electrical switch being connected between said electrical signal splitter and said radio transmitter for switching said first radio signal, and said second electrical switch being connected between said radio signal splitter and said electrical-to-optical converter for switching said second electrical signal.

* * * * *